United States Patent
Biderman

(10) Patent No.: US 8,146,826 B2
(45) Date of Patent: *Apr. 3, 2012

(54) INTELLIGENT IDENTIFICATION OF MULTIMEDIA CONTENT FOR SYNCHRONIZATION

(75) Inventor: David L. Biderman, San Francisco, CA (US)

(73) Assignee: AOL Inc., Dulles, VA (US)

( * ) Notice: Subject to any disclaimer, the term of this patent is extended or adjusted under 35 U.S.C. 154(b) by 558 days.

This patent is subject to a terminal disclaimer.

(21) Appl. No.: 12/365,313

(22) Filed: Feb. 4, 2009

(65) Prior Publication Data

US 2009/0138936 A1 May 28, 2009

Related U.S. Application Data

(63) Continuation of application No. 11/025,592, filed on Dec. 30, 2004, now Pat. No. 7,490,775.

(51) Int. Cl.
*G06K 7/10* (2006.01)

(52) U.S. Cl. .................................. 235/472.01; 235/381

(58) Field of Classification Search ............. 235/472.01, 235/380, 381; 725/87, 134, 142; 369/30.06, 369/30.08, 30.38, 30.39

See application file for complete search history.

(56) References Cited

U.S. PATENT DOCUMENTS

| | | | |
|---|---|---|---|
| 5,781,889 A | | 7/1998 | Martin et al. |
| 6,192,340 B1 | | 2/2001 | Abecassis |
| 7,118,498 B2 * | | 10/2006 | Meadows et al. ............. 473/407 |
| 7,904,069 B2 * | | 3/2011 | Rye et al. ...................... 455/418 |
| 2002/0083234 A1 | | 6/2002 | Izawa |
| 2003/0093790 A1 | | 5/2003 | Logan et al. |
| 2004/0086120 A1 | | 5/2004 | Akins et al. |
| 2004/0093393 A1 * | | 5/2004 | Calligaro et al. ............. 709/219 |
| 2004/0147329 A1 * | | 7/2004 | Meadows et al. ............. 473/131 |
| 2005/0021470 A1 | | 1/2005 | Martin et al. |
| 2005/0216855 A1 | | 9/2005 | Kopra et al. |
| 2007/0067290 A1 * | | 3/2007 | Makela ............................. 707/6 |
| 2007/0101373 A1 | | 5/2007 | Bodlanender et al. |
| 2010/0203822 A1 * | | 8/2010 | Kenagy ....................... 455/3.01 |

OTHER PUBLICATIONS

Screen shot of Apple Itunes, before Dec. 30, 2004, 2 pages.
Screen shot of Microsoft Media Player, before Dec. 30, 2004, 2 pages.
"Audible.com—Audio That Speaks to You Wherever You Are", Retrieved From the Internet: http://www.audible.com, on Nov. 3, 2005, 2 pages.
"Audible.com—Sample Audio", Retrieved From the Internet: http://www.audible.com, on Nov. 3, 2005, 2 pages.
"Audible.com—How Audio Works", Retrieved From the Internet: http://www.audible.com, on Nov. 3, 2005, 3 pages.
"Connect—Music Downloads Powered by Sony", Retrieved From the Internet: http://musicstore.connect.com/, on Nov. 3, 2005, 2 pages.

(Continued)

*Primary Examiner* — Thien M Le
(74) *Attorney, Agent, or Firm* — Finnegan, Henderson, Farabow, Garrett & Dunner, LLP

(57) ABSTRACT

An intelligent synchronization tool ensures access to desired content in a manner that automatically keeps the content current on the portable media device. A variation threshold or user-specified degree of content variation may be introduced among content downloaded to a user's mobile device to prevent the user from becoming bored. Furthermore, intelligent synchronization may automatically populate the portable media device with popular content to save a user time and/or use passive monitoring techniques to ascertain a user's preferences for subsequent population.

20 Claims, 9 Drawing Sheets

OTHER PUBLICATIONS

"Connect—Welcome to the Connect Music Store", Retrieved From the Internet: http://musicstore.connect.com/promos/dc/take_tour.html, on Nov. 3, 2005, 2 pages.

"Kazaa Gold—Free Unlimited Music Downloads From Your Favorite Artists", Retrieved From the Internet: http://www.mykazaa-gold.com/?Its=AOL_US_CAN_$0.94_music%20online, on Nov. 3, 2005, 1 page.

"Kazaa Gold—Frequently Asked Questions", Retrieved From the Internet: http://www.mykazaa-gold.com/faq.php, on Nov. 3, 2005, 3 pages.

"Grokster—Get Grokster Pro", Retrieved From the Internet: http://www.grokster.com/, on Nov. 3, 2005, 1 page.

"iTunes 6—The Best Digital Jukebox and #1 Music Download Store" Retrieved From the Internet: http://www.apple.com/itunes/, on Nov. 3, 2005, 3 pages.

"The Best Digital Jukebox and #1 Music Download Store. Now With Video." Retrieved From the Internet: http://www.apple.com/itunes/overview/, on Nov. 3, 2005, 2 pages.

"Download iTunes 6" Retrieved From the Internet: http://www.apple.com/itunes/download/, on Nov. 3, 2005, 2 pages.

"Your 24-7 Video Store" Retrieved From the Internet: http://www.apple.com/itunes/videos/, on Nov. 3, 2005, 2 pages.

"iPod Shuffle—Give Chance a Chance" Retrieved From the Internet: http://www.apple.com/ipodshuffle/, on Nov. 3, 2005, 2 pages.

"The New iPod" Retrieved From the Internet: http://www.apple.com/ipod/ipod.html, on Nov. 3, 2005, 3 pages.

"LimeWire 4.9", Retrieved From the Internet: http://www.limewire.com/english/content/home.shtml, on Nov. 3, 2005, 1 page.

"For Turbo Charged Downloads, Use LimeWire PRO", Retrieved From the Internet: http://www.limewire.com/english/content/download.shtml, on Nov. 3, 2005, 1 page.

"LimeWire is the Flagship Client on the Gnutella Network", Retrieved From the Internet: http://www.limewire.org, on Nov. 3, 2005, 2 pages.

"Lime Wire Is Proud to Announce the Release of LimeWire 4.9.37", Retrieved From the Internet: http://www.limewire.com/english/content/features.shtml, on Nov. 3, 2005, 2 pages.

"What is LimeWire?", Retrieved From the Internet: http://www.limewire.com/english/content/company.shtml, on Nov. 3, 2005, 2 pages.

"MP3 Music Downloads—Buy MP3 Music Online—Digital Music Downloads", Retrieved From the Internet: http://www.mp3.com/, on Nov. 3, 2005, 5 pages.

"Musicmatch Jukebox—World's Best Music Player", Retrieved From the Internet: http://www.musicmatch.com/, on Nov. 3, 2005, 1 page.

"New Musicmatch Jukebox Plus 10—The Best Media Player for Music", Retrieved From the Internet: http://www.musicmatch.com/download/plus/jukebox_intro.htm, on Nov. 3, 2005, 2 pages.

"Musicmatch On Demand", Retrieved From the Internet: http://www.musicmatch.com/download/ondemand_intro.htm, on Nov. 3, 2005, 1 page.

"Musicmatch Radio", Retrieved From the Internet: http://www.musicmatch.com/download/radio_intro.htm?OS=pc, on Nov. 3, 2005, 1 page.

"Musicmatch Music Store", Retrieved From the Internet: http://www.musicmatch.com/download/music_intro.htm?OS=pc, on Nov. 3, 2005, 1 page.

"Napster—All the Music You Want. Any Way You Want It.", Retrieved From the Internet: http://www.napster.com/?affiliate_id=88&referral_id=CJ&AID=8353205&PID=1555503, on Nov. 3, 2005, 2 pages.

"Napster—Search for Music", Retrieved From the Internet: http://www.napster.com/search_music.html, on Nov. 3, 2005, 3 pages.

"Napster—More About Napster", Retrieved From the Internet: http://www.napster.com//more_about_napster.html, on Nov. 3, 2005, 2 pages.

"Napster—Frequently Asked Questions", Retrieved From the Internet: http://www.napster.com/faq.html, on Nov. 3, 2005, 3 pages.

"Rhapsody—Premium Music Subscription Service", Retrieved From the Internet: http://www.real.com/dmm/rhapsody, on Nov. 3, 2005, 1 page.

"Yahoo! Music", Retrieved From the Internet: http://music.yahoo.com/, on Nov. 3, 2005, 2 pages.

"Yahoo! Music Engine: Rip, Play, Burn, Manage and Explore Music—for Free", Retrieved From the Internet: http://music.yahoo.com/musicengine/, on Nov. 3, 2005, 2 pages.

"LAUNCHcast Home", Retrieved From the Internet: http://music.yahoo.com/launchcast/setup.asp, on Nov. 3, 2005, 3 pages.

* cited by examiner

In populating your iPod 210

Generate sequence selection:

☐ Use mood-based playlisting system 210A
☐ Generate multiple sequences 210B
☐ Mix themes 210C

Variation 220

Change my content every:

☐ Synchronization 220A
☐ every day 220B
☐ every week 220C
☐ after every song has been listened to once 220D

230

| Theme 230A | |
|---|---|
| Country | ☐ |
| Disco | ☐ |
| 70's | ☐ |

1. Prefer over everything else
2. Strongly favor
3. Prefer
4. OK
5. OK occasionally ☐ Artist 230B
Brooks & Dunn
Garth Brooks
Randy Travis
Hank Williams, Jr.
Bee Gees
Village People
Eagles
Steve Miller Band 6. include at least *some*
7. include *more*
8. *don't* include ☐ Album 230C
Van Halen I
Van Halen II
Saturday Night Fever
Bee Gees Greatest Hits
Eagles Greatest Hits Vol. 1
Eagles Greatest Hits Vol. 2

☐ Songs 230D
Staying Alive
Tequila Sunrise
Already Gone

☐ Click here to _____ artists

INTELLIGENT IDENTIFICATION OF MULTIMEDIA CONTENT FOR SYNCHRONIZATION

CROSS-REFERENCE TO RELATED APPLICATIONS

This application is a continuation application of U.S. application Ser. No. 11/025,592, filed Dec. 30, 2004, the entirety of which is incorporated herein by reference. This application also incorporates by reference the following applications: U.S. application Ser. No. 10/448,469, entitled "Personalizing Content", and filed May 30, 2003; U.S. application Ser. No. 10/448,316, entitled "Personalizing Content Using an Intermediary Bridge", and also filed May 30, 2003; and U.S. application Ser. No. 10/715,216, entitled "Dynamic Suggestion of Information to an Online User", and filed on Nov. 18, 2003.

TECHNICAL FIELD

This document relates to managing content on an electronic device.

BACKGROUND

Digital content is distributed on a wide variety of devices and in a wide variety of formats, and frequently includes one or more of movies, music, slides, games and other forms of electronic content.

SUMMARY

In one general sense, content may be managed on a portable media device by identifying a library of one or more content selections, accessing one or more rules related to user preferences for content, structuring the library of one or more content selections based on the rules to define at least one group of content selections of interest to the user, determining a storage capability for a portable media device, generating a first configuration for the portable media device, wherein the first configuration indicates a first subset of content selections from among the group of content selections of interest to be loaded to the portable media device, accessing one or more additional rules related to user preferences requiring variation of content to be loaded to the portable media device, and during a subsequent connection between the portable media device and the library, generating a second configuration for the portable media device, wherein the second configuration indicates a second subset of content selections from among the group of content selections of interest to be loaded to the portable media device, the second subset differing from the first subset in accordance with the one or more additional rules requiring variation of the content selections loaded to the portable media device.

Implementations may include one or more of the following features. For example, the library may be dynamic such that the group of content selections changes between the generation of the first configuration and generation of the second configuration, and the user preferences vary the content selections based on criteria other than the dynamic status of the library. Determining the storage capability may include determining the storage capability that reflects an entire physical storage capacity of the portable media device. Determining the storage capability may include determining the storage capability that reflects a portion a physical storage capacity of the portable media device allocated to playlist storage. The rules requiring variation may include a variation threshold. The variation threshold may be expressed as a desired rate of change for content defining the group of content available to be loaded. The variation threshold may be expressed as a desired percentage of change for content defining the group of content available to be loaded and/or with respect to one partition on a portable media device with multiple partitions. Each of the multiple partitions may have a different variation threshold. A user interface may be presented to enable user input of the rules requiring variation. The user may be solicited to specify a rule to be designated as the rules related to the user preferences. Accessing the rules related to the user preferences may include accessing a service-provider rule or a default rule. Accessing the rules related to the user preferences may include accessing a storage instruction configured to allocate partitions on the portable media device. Accessing the storage instruction may include allocating partitions by absolute criteria, relative criteria, or a combination of relative criteria and absolute criteria.

Accessing the storage instruction may include specifying a preference for a genre, an artist, an album, an actor, an author, a director, a studio, a record label, a tempo, a mood, a station, a channel, or a content provider. Specifying the preference may include specifying an absolute preference, a relative preference, a factoral preference, a frequency preference, a boolean preference, a personal preference, a household preference, or a demographic preference. Accessing the rules related to user preferences may include specifying an update basis indicating how the portable media device should be updated. Specifying the update basis may include specifying that the portable media device should vary content every synchronization, every day, every week, after every content selection on the portable media device has been perceived, after a particular content selection on the portable media device has been perceived, or when a replacement selection becomes available. Accessing the rules related to user preferences may include specifying how the portable media device should operate in the event that the portable media device exhausts storage or is projected to exhaust storage. Accessing the rules related to user preferences may include accessing a promotional instruction configured to include at least some promotional content on the portable media device. Accessing the promotional instruction may include establishing a transaction gateway so that the user may interact with the promotional content on the portable media device to initiate a transaction upon a subsequent communication with the portable media device.

Generating the first configuration may include determining, for one or more content selections, a metric indicating a predicted user interest, relating the metrics to determine a relative priority for the content selection, using intercontent selection factors to adjust the metric, identifying a conflict between two different content selections having the same relative priority, resolving the conflict, and identifying a selected subset of content selections from the library that should be loaded to the portable media device. Using intercontent selection factors may include increasing a first metric for a first content selection when a user prefers a second content selection and the second content selection is determined to be related to the first content selection. The second content selection may be determined to be related to the first content selection when the first content and the second content selection are associated with a same genre, a same artist, a same album, a desired transition, a desired mood, a desired balance of content, a desired tempo, or a desired advertisement placement. Resolving the conflict may include removing a first content selection in favor of a second content selection or identifying content more responsive to the user interest that complies with the storage capability.

DESCRIPTION OF DRAWINGS

FIG. 2 illustrates an exemplary UI enabling a user to manage content on a portable media device using more detailed metrics.

DETAILED DESCRIPTION

Figure 1:
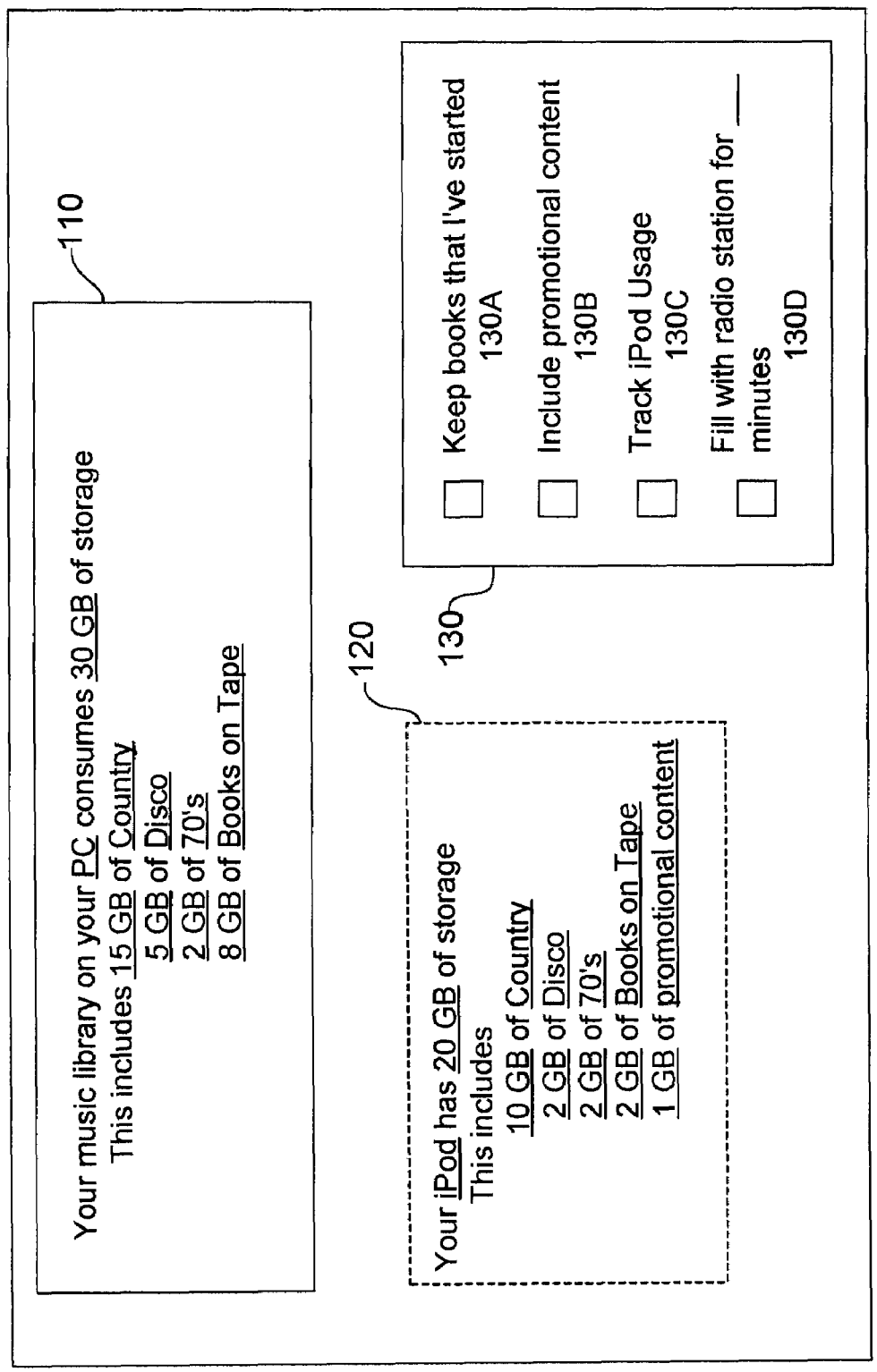
FIG. 1 illustrates an exemplary user interface (UI) enabling a user to manage content on a portable media device.

Portable media devices, such as Apple Computer's iPod and Creative Labs' Nomad, are wildly popular. They can support audio, video, and other rich media formats (e.g., games). One challenge is that a user's library often is larger than the storage on the portable media device. Even portable media devices with the largest storage capabilities are inadequate for many users. And adding support for video or elaborate multichannel formats such as SACD/DVD-Audio would drastically reduce a portable media device's ability to support a listener's library. Further confounding the situation, many users prefer smaller devices (e.g., an iPod mini (4 GB, 1,000 songs) or Rhomba (256 MB)) with less storage, thus, storage constraints are reached earlier on smaller devices.

Given the above storage and other constraints, many users are only able to load a portion of their library. Managing a library/playlist for a portable media device can be time consuming and tedious. Furthermore, if the user does not vary the content on the portable media device, the user may become bored 'playing' the same content repeatedly and user satisfaction/interest may diminish.

Thus, an intelligent synchronization tool ensures access to desired content in a manner that automatically keeps the content current on the portable media device. In some implementations, a threshold or user-specified degree of content variation may be introduced among content downloaded to a user's mobile device to prevent the user from becoming bored. Furthermore, intelligent synchronization may automatically populate the portable media device with popular content to save a user time and/or use passive monitoring techniques to ascertain a user's preferences for subsequent population.

More particularly, in loading content to a portable media device, the portable media device uses rules and metrics to identify a subset of content to be loaded from a library to a larger media device. For example, a personal computer with a large collection of digitized may be used to manage a portable audio player. The personal computer may include a configuration wizard that elicits a user's preferences. The library is structured based on the rules to define groups of content responsive to a user's interests (e.g., rock and country).

The personal computer recognizes that portable audio player is limited to a threshold of storage. In order to maximize the enjoyment of content loaded to the portable audio player, a first configuration is generated for the portable media device. The first configuration indicates a first subset of content selections from among the groups of content to be loaded to the portable media device. For example, particular rock selections may be loaded to a rock partition and particular country selections may be loaded to the country selections. One or more additional rules related to user preferences requiring variation of content are accessed. For example, the user may specify that 30% of the rock selections and 20% of the country selections be varied every synchronization. And, during a subsequent connection between the portable audio player and the computer, a second configuration is loaded to the portable audio player that reflects one or more user preferences for varying the content selections on the portable audio player. As a result, 30% of the rock selections and 20% of the country selections are replaced with content selections not present in the first configuration.

In another example, a user's rules may provide for three classes of content. The classes may include (1) a most popular class occupying 50% of storage for songs that a user is known to prefer; (2) a "used-to-like" bin for songs the user used to enjoy frequently but perhaps only now enjoys on a limited basis; and (3) a "sample" bin of promotional content or previously unheard content to elicit user reaction, explore changing tastes, or generate a purchase transaction. As the user listens to their portable media device, the content in different classes of content may be varied while still preserving the nature of the classes. For example, while the content in the most popular class may vary, the content in the most popular class is determined to be the user's preferred content. The rules also may define how and which content is presented in a playlist (e.g., preserve a theme or artist) or how the playlist is generated in response to user manipulation of the portable media device (e.g., next track controls). As the user synchronizes at a later time, the content selections on the portable media device may be updated so that (1) songs from the most popular class are removed according to criteria such as a predefined ratio of threshold of change (e.g., a variation threshold) specified by the user (e.g., 10% of the music shall be changed each update) or changes in user preference; (2) "used-to-like" songs are added and removed in accordance with a variation function and changing user tastes; (3) promotional content is removed if the user elects not to take advantage of or accept the promotion; and (4) new promotional content is added as a result of new promotions.

FIG. 1 illustrates an exemplary user interface UI 100 enabling a user to manage content on a portable media device. UI 10 includes a library manager interface 110, a portable media device interface 120, and a miscellaneous interface 130. Typically, the library manager interface 110 and the portable media device interface 120 enable a user to ascertain a relationship between content selections loaded on a library and those loaded on a portable media device. The miscellaneous interface 130 also includes controls that affect the relationship between the library and the portable media device, for example, by specifying additional criteria by which content is populated.

Library manager interface 110 provides a high level overview of content residing on a user's PC (as indicated by the PC (Personal Computer) label that consumes 30 GB of storage). As shown, each of the descriptors appears as a hyperlinked label. Typically, each of the hyperlinked labels may be invoked (e.g., via selection using a mouse pointer device) to retrieve additional information and/or change the value shown. For example, the Disco label may be selected to render a popup display of content selections stored in the library determined to be affiliated with Disco. Library manager interface 110 indicates that the library includes 15 GB of country, 5 GB of Disco, 2 GB of 70's music, and 8 GB of Books on Tape.

Portable media device interface 120 indicates that the user's portable media device has 20 GB of storage. The portable media device includes 10 GB of Country, 2 GB of Disco, 2 GB of 70's music, and 1 GB of promotional content. Portable media device interface 120 includes hyperlinked labels to describe the allocation of storage and the genre of content. However, rather than render information descriptive of the underlying content as library manager interface 110 would likely do, the labels appearing in portable media device interface 120 also may be used to change the allocation of storage or the genre for a particular allocation.

Miscellaneous interface 130 includes tabs to (1) "Keep books that I've started" 130A; (2) include promotional content 130B; (3) track portable media device usage 130C; and (4) fill the radio station for a user-specified number of minute 130Ds. "Keep books that I've started" 130A represents a control that may be invoked that enables a user to keep listening to an electronic audio book that the user has started, even when other content selections are being added and removed. Including promotional content 130B enables a user to participate in promotional offerings. The user may be allowed limited access to promotional content in order to induce the user to accept purchase criteria. Tracking portable media device usage 130C allows user preferences to be tracked so that the portable media device may be populated with content responsive to the predicted interest of a user. In addition, the portable media device may be populated with content from an online radio station for a user-specified number of minutes. Selecting one or more miscellaneous options appearing in the miscellaneous interface may impact which and how much content may be loaded from the library to the portable media device. For example, selecting inclusion of promotional content and/or filling the portable media device with content from a radio station 130D may reduce an amount of storage available on the portable media device. As a result, an entry responsive to the selection may appear (e.g., the portable media device has 1 GB of storage) and also reduce the size of storage allocated for other genres (e.g., the amount of storage allocated for country may be automatically reduced from 11 GB (not shown) to 10 GB as shown). Other examples of reducing the storage for other content selections include removing the most recently listened to content, removing the least popular content, removing content uniformly from more than one genre, removing content from a disfavored genre, and/or removing content based on its relation or lack of relation to other content on the portable media device.

FIG. 2 illustrates an exemplary UI 200 enabling a user to manage content on a portable media device using more detailed metrics. UI 200 includes a playlisting interface 210, a variation interface 220, and a rule interface 230.

Playlisting interface 210 allows the content management system to generate one or more automated playlists for the portable media device. As indicated, using playlist interface 210, a user may "generate sequence selection" options that invoke a mood-based playlisting system 210A, generate multiple sequences of content 210B, and/or mix themes 210C. Invoking a mood-based playlisting system 210A enables a content management system to select content in an automated manner determined to preserve a mood, and thus increase listener retention rates between two content selections. Various mood-based playlisting systems are described in U.S. application Ser. Nos. 10/448,469, and 10/448,316, both of which were filed on May 30, 2003. Generating multiple sequences of content 210B enables multiple playlists to be generated. For example, a first playlist may present songs in a particular order using a first model while a second playlist may present songs in a different order using a second model. Mixing themes 210C enables content selections with different characteristics to be interspersed. For example, a default playlisting engine may avoid presenting a hip hop content selection after a country content selection. However, the "Mix themes" button may be invoked so that the playlist may be assembled from across genres or include content selections otherwise determined to include incompatible characteristics.

Variation interface 220 enables the user to specify the frequency with which content loaded on the portable media device is varied. For instance, as shown, variation interface 220 enables the user to change at least some of the content selections on the portable media device every synchronization 220A, every day 220B, every week 220C, or after song has been listened to once 220D. Changing the content selection every synchronization 220C may be used to replace at least one content selection loaded on the portable media device with a different content selection.

In some implementations, even if the variation interface 220 is selected, the content may be varied if the library is not larger than the storage available on the portable media device. The degree and extent of the variation may be based on the relation between the size of the library and the size of the portable media device, the extent to which a user has already listened to content selections on the portable media device, and/or a user's preferences for an amount of variation. For example, some users may prefer subtle variations (e.g., only vary 10% of the content) while other users may prefer more substantial variations (e.g., vary more than 50% of the content).

Rule interface 230 enables a user to express a preference for which content selection is loaded to the portable media device. Rule interface 230 enables a user to specify preferences by theme 230A (e.g., country, disco, or 70's music), by artist 230B (e.g., Brooks & Dunn, Garth Brooks, Randy Travis, Hank Williams Jr., the BeeGees, the Village People, the Eagles, and the Steve Miller Band), by album 230C (e.g., Van Halen I and II, Saturday Night Fever, BeeGees Greatest Hits, and the Eagles' Greatest Hits Vols. 1 and 2), and by song 230D (e.g., Staying Alive, Tequila Sunrise, and Already Gone). For each criteria, the user may elect to (1) prefer the element over everything else; (2) Strongly favor; (3) Prefer; (4) indicate that the element is 'OK'; (5) indicate that the element is 'OK' occasionally; (6) include at least some of the element (e.g., include at least some songs from the album); (7) include more of the element (or alternatively, include less); and (8) don't include the element on the portable media device.

Generally, by enabling the user to elect an option for the element, the user is able to express their preferences without necessarily requiring the user to quantify the impact of any one rule on whether particular content selections will be loaded to the portable media device. Some of the options are absolute criteria in that "Prefer over everything else" or include at least some will load content selections associated with the element to the portable media device and "don't include" precludes the content selections associated with the element from being loaded to the portable media device. Other options enable a user to freely express their preferences so that the content management system may assimilate the use preferences and generate a configuration of content selections that are loaded to the portable media device that is responsive to the user's preferences as specified by the user.

Enabling the user to express their preferences enables the extent to which content selections related to the user preference will appear in a library on a portable media device as the content is being varied, and a particular content selection is being rotated on and off of the portable media device. For example, while content that is "preferred over everything else" will almost always appear, "preferred" content may be stored on the portable media device 50% of the time, "OK" content may be stored on the portable media device 25% of the time, and "OK occasionally may be stored on the portable media device 10% of the time.

Figure 3A:
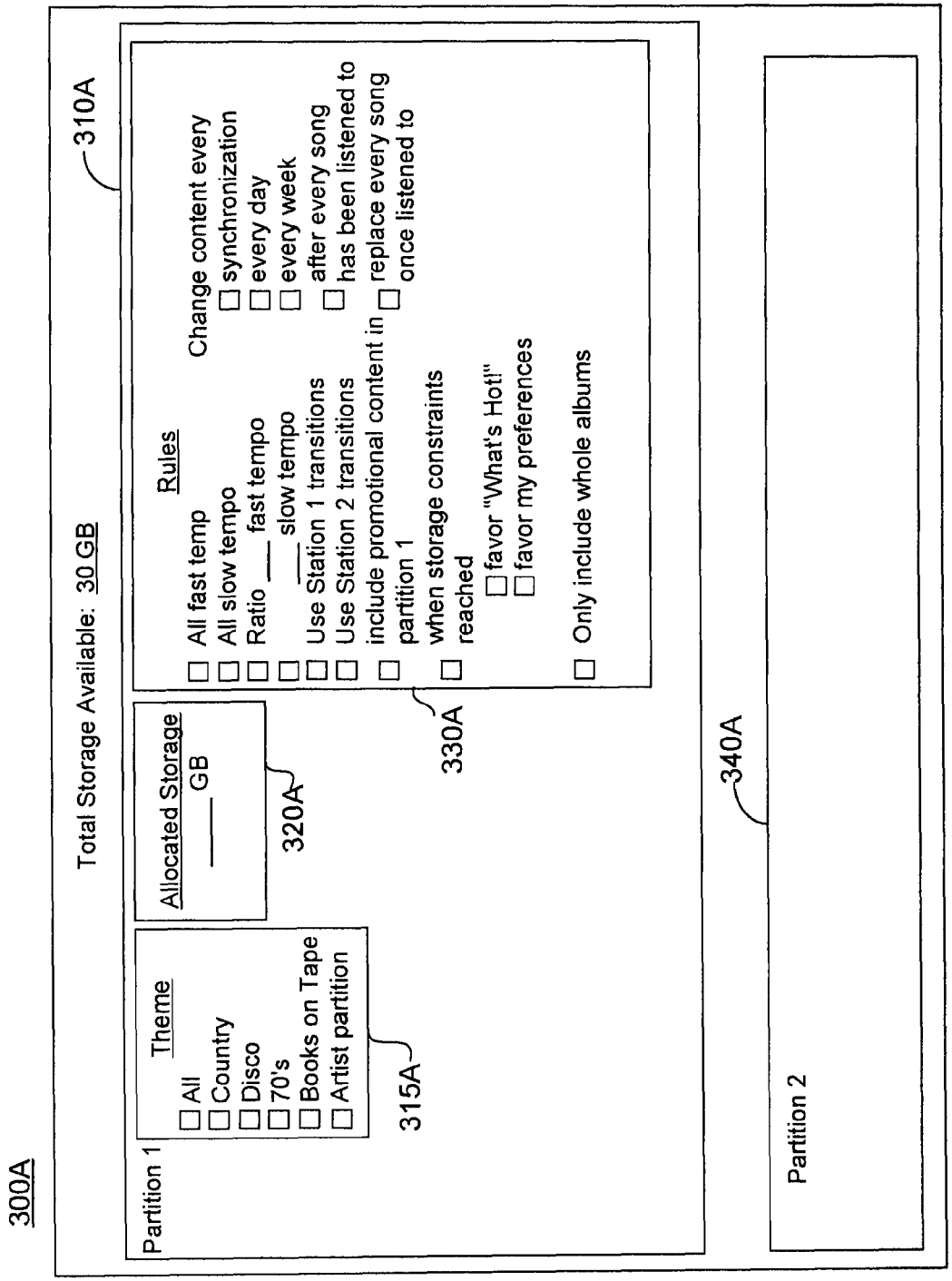
FIG. 3A illustrates an exemplary UI configured to enable a user to allocate partitions of content on a portable media device.

FIG. 3A illustrates an exemplary UI 300A configured to enable a user to allocate partitions of content on a portable media device. As shown, UI 300A includes partition 310A and partition 340A for a portable media device with 30 GB of storage available. As shown partition 310A enables the user to specify the theme for the partition 310A using theme preference interface 315A. Theme preference interface 315A includes options for all genres, country, disco, 70's music, books on tape, and an artist partition. Allocation interface 320A enables a user to specify the storage allocated to a partition. Rules interface 310A enables a user to specify one or more rules that determine which content selections are loaded to the portable media device. The exemplary rules shown enable a user to specify (1) all fast tempo; (2) all slow temp; (3) specify the ratio of fast tempo songs to slow tempo songs; (4) use station 1 or station 2 transitions for the playlist, and select content selections so that the underlying transitions may be realized; (5) include promotional content; (6) when storage constraints are reached, favor "What's Hot" or the user's preferences (portions of U.S. application Ser. No. 10/715,216, which is incorporated by reference, are directed to "What's Hot" technologies); or (7) only include whole albums. Loading content by tempo may be done by accessing a database of tempo information for songs and selecting the content selections using the retrieved content. Station transitions may include using established transitions so that a user is less likely to shuffle or change a playlist. For example, a station transition may specify that Bob Dylan should be followed by the Grateful Dead. In one sense, the station transition relates to a playlist in that the sequence of the content is specified. In another sense, specifying the station transition requires the underlying content selections to be loaded to the portable media device. The storage constraints option enables the user to specify that, when the storage required to support content selections identified by the user exceed available storage constraints in the partition, the content selections identified by the user may favor "What's Hot" for other communities or demographics, or favor what the user prefers.

Similar to the variation interface 220 shown in UI 200, rules 330A allow a user to change content every synchronization, every day, every week, after every song has been listened to, or replace every song listened to once.

Partition 340A may include options similar to partition 310A except that partition 340A may be configured to reflect other preferences for the user. For example, a user may configure partition 310A to reflect the user's interest in country music while configuring partition 340A to reflect the user's interest in 70's music.

Figure 3B:
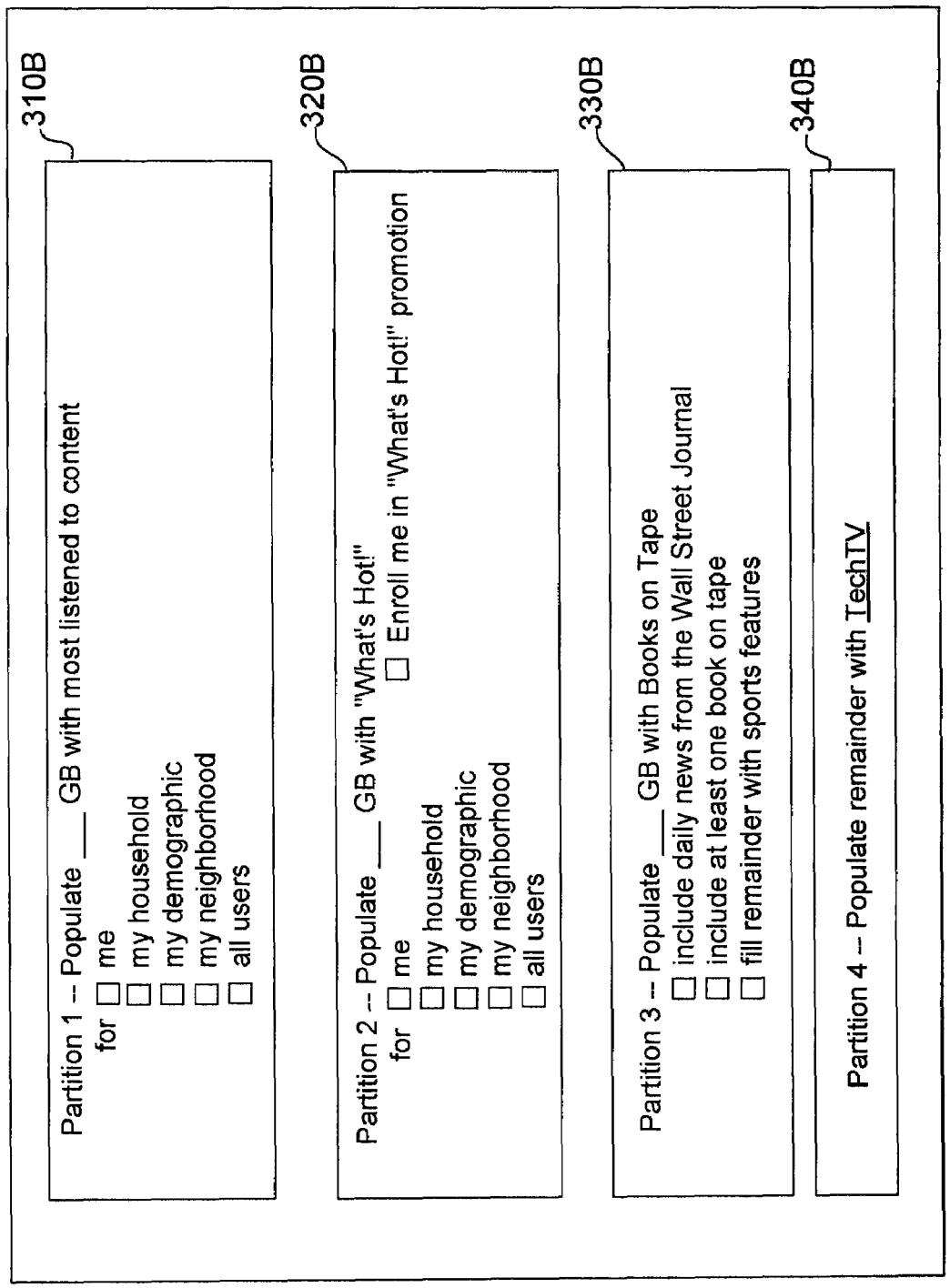
FIG. 3B illustrates an exemplary UI enabling a user to allocate storage on a portable media device using preferences for different demographics.

FIG. 3B illustrates an exemplary UI 300B enabling a user to allocate storage on a portable media device using preferences for different demographics or content types, effectively enabling the user to create disparate content sources within their portable media storage, each of which being configured to store an enable playback of user-designated content that is periodically updated according to user specifications. UI 300B includes partition 310B, partition 320B, partition 330B, and partition 340B. Partition 310B enables a user to specify a size of partition 310B and to identify the most listened to content selections for (1) the user; (2) the user's household; (3) the user's demographic; (4) the user's neighborhood; and/or (5) all users.

Partition 320B enables a user to specify a size for a "What's Hot" partition, where "What's Hot" is defined for (1) the user; (2) the user's household; (3) the user's demographic; (4) the user's neighborhood; and (5) all users. The "What's Hot" criteria differs from the most-listened to metric in that "What's Hot" uses recent interest in a content selection (e.g., a delta or acceleration function) while the most-listened to metric represents an absolute metric identifying what users are repeatedly interested in.

Partition 330B enables the user to specify an amount of storage for books on tape. Options for the books on tape partition may include an option to receive daily news from the Wall Street Journal, include at least one book on tape, and fill the remainder of the books on tape with sports features.

Partition 340B enables the user to populate the remainder of the storage available on the portable media device with programming entitled "TechTV."

Figure 3C:
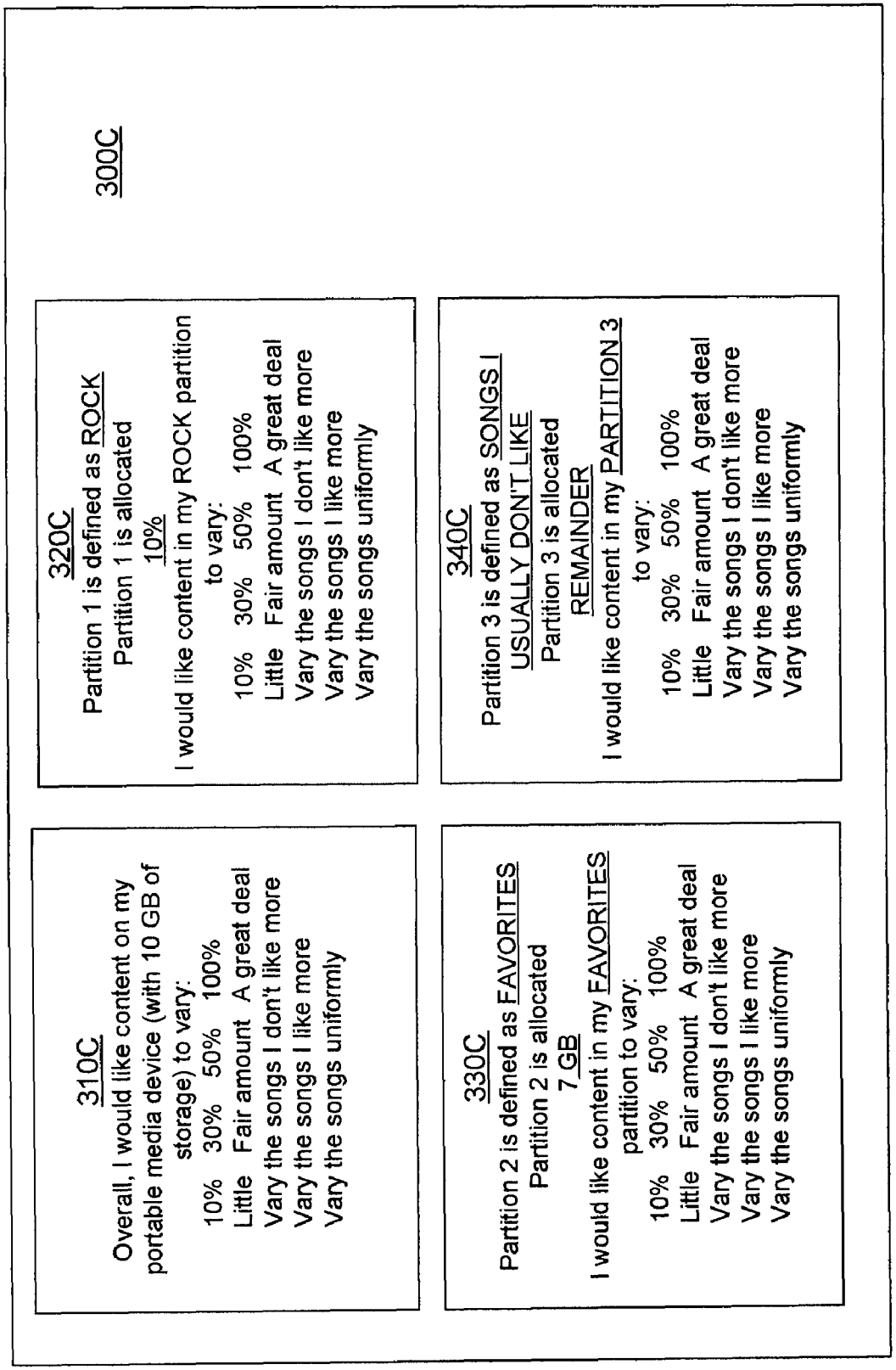
FIG. 3C illustrates an exemplary UI enabling a user to specify variation thresholds for a portable media device.

FIG. 3C illustrates an exemplary UI 300C enabling a user to specify variation thresholds for a portable media device. In particular, UI 300C illustrates how a variation threshold may be specified with respect to the entire storage capacity of a portable media device and also how the variation threshold may be specified with respect to partitions that use a portion of the storage capacity of a portable media device. Generally, UI 300C may be used to control variation of content structured by a user's preferences, for example, using the UIs shown in FIGS. 1-3B. However, UI 300C also may be used with other user preference and library management systems.

As shown, UI 300C includes an overall variation control 310C, a genre variation control 320C, a personalized variation control 330C, and a user-defined variation control 340C.

Overall variation control 310C provides a single control pane that enables a user to specify rules requiring variation for overall content residing on a portable media device. As shown, the portable media device managed by UI 300C includes 10 GB of storage. Overall variation control 310C enables a user to specify a variation threshold by percentage (e.g., 10%, 30%, 50%, and 100%), or by label (e.g., vary a little, a fair amount or a great deal). Enabling the user to specify the variation by label allows a user to not consider the precise implications of varying by percentage, and also allows the UI provider to specify default values for the labels that represent a variation likely to be responsive to a user's desire (e.g., using previously-performed market testing). While the percentages and labels shown appear to represent a spectrum of variation, the percentages and labels need not interrelate. For example, the little, fair amount, and great deal labels may represent variation thresholds of 15%, 40%, and 60%, respectively.

In addition, overall variation control 310C also enables the user to (1) vary the songs that the user doesn't like more; (2)

vary the songs that the user likes more; and (3) vary the songs uniformly. Enabling the user to control the variation based on preference allows the user a degree of variation control without requiring the user to establish and configure a partition. For example, a synchronization tool may assimilate expressed user ratings (e.g., user ranking of a song based on a scale of 1-10) and inferred user ratings (e.g., based monitoring user requests, repeats, and skipping of songs) in order to transparently structure content into more than one tier of content organized by user preference. Put differently, the user need not be aware of a tiered structure to the content. The synchronization tool then may apply different variation thresholds to the different tiers. For example, when the user elects to vary "Songs I like" more, the synchronization tool may set the variation threshold at 50%, while songs that are not in the "Songs I like" tier have a variation threshold of 10%.

Genre variation control 320C, personalized variation control 330C, and a user-defined variation control 340C include many of the same variation threshold controls that were described with respect to overall variation control 310C (e.g., they enable a user to specify a variation threshold for a partition by percentage, label, or with respect to user preference). However, genre variation control 320C, personalized variation control 330C, and a user-defined variation control 340C illustrate how a user may specify different variation thresholds for different partitions of content where the user has defined the partition. Note that partition 1 is allocated by percentage of overall storage, partition 2 is allocated with respect to an absolute threshold of storage, while partition 3 is allocated the remaining storage.

Genre variation control 320C includes ROCK, a genre that may be user or system defined. Personalized variation control 330C is configured to reflect a user's favorite content. The 'favorite' status may be determined using explicit or inferred determinations. In addition, the 'favorite status' may coincide with the "songs I like" determinations discussed previously with respect to overall variation control 310C. However, the personalized variation control 330C may provide a user with more granularity in control in that the size of the partition and the variation threshold may be specified more precisely. User-defined variation control 340C illustrates how the remainder of the storage of may be allocated to songs that the user doesn't usually prefer. By providing an option to allocate the remainder of the available storage, the user need not precisely map out the requirements for each partition. Rather, a user may configure some partitions with varying degrees of precision and configure the remainder of storage with reduced complexity instructions, if so desired.

A variety of different manners may be used to resolve conflicts arising from configuring the variation threshold. In one implementation, the user is explicitly notified that a desired variation threshold cannot be reached. For example, when the user specifies a 50% variation threshold and inadequate content exists to support the desired degree of variation, the user may be notified that the desired variation cannot be supported. The notification then may ask the user to change the variation threshold, ask the user to change to rule defining the partition with which the variation threshold is set (so as to broad the pool of content available for variation), or indicate that a different variation threshold will be used. In another implementation, the synchronization tool does not notify the user that the desired variation threshold cannot be realized. Instead, the synchronization tool may automatically user a different variation threshold, or automatically change to rule defining the partition with which the variation threshold is set so that content deemed likely to be responsive to the user's interest is added to the available pool and the desired variation threshold may be realized. In one implementation, the specific percentages may be entered by a user. For example, the user may use an interface similar to UI 300B to specify a certain percentage of storage for a certain genre, theme, artist, or mood.

Figure 4:
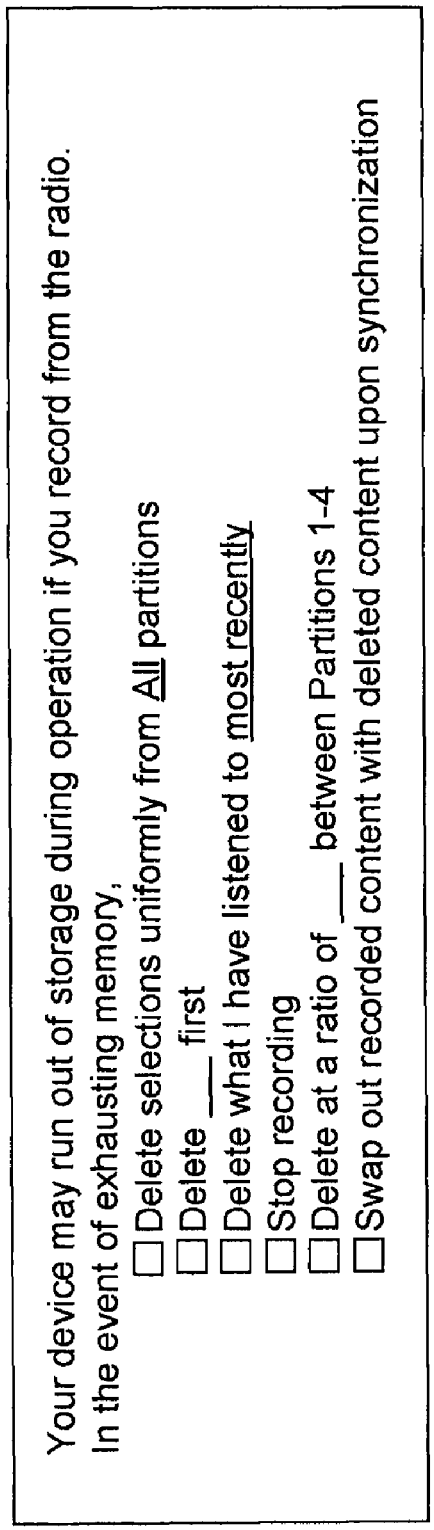
FIG. 4 illustrates an exemplary UI enabling a user to allocate storage on a portable media device in the event that memory is exhausted.

FIG. 4 illustrates an exemplary UI 400 enabling a user to allocate storage on a portable media device in the event that memory is exhausted. In some implementations, the portable media device may include a content capturing capability, for example, to capture over-the-air content (e.g., radio) or support an onboard camera or microphone or to capture content exchanged between peer portable media devices (e.g., using a wireless interface). UI 400 includes options to (1) delete selections uniformly from all partitions; (2) specify a rule for content to be deleted first (e.g., delete country music content selections first); (3) delete what has been listened to most recently; (4) stop recording; (5) specify a ratio at which content from different partitions should be deleted (e.g., 2-1-1-1 to delete two content selections from partition 1 and one content selection each from partitions 2-4 or, alternatively, to delete content selections occupying twice the storage from partition 1 than is deleted from each of partitions 2-4); and (6) swap out recorded content with deleted content upon synchronization. Deleting content selections uniformly may include using a 'round robin' approach to deleting content from the partitions. The round robin approach may uniformly delete content on a selection-by-selection basis (e.g., delete one content selection from each partition) or on a storage basis (e.g., delete 70 MB from each partition regardless of the number of content selections in the 70 MB). Deleting the most recently-listened to content may include using internal monitors that track usage on a portable media device such that the content selections whose internal monitors indicate the content was listened to most recently are deleted. Thus, using the "swap out recorded content" selection, a user may confidently capture content on an ad hoc basis using their portable media device, and then replace the captured content with the preferred content once the captured content has been uploaded.

Figure 5:
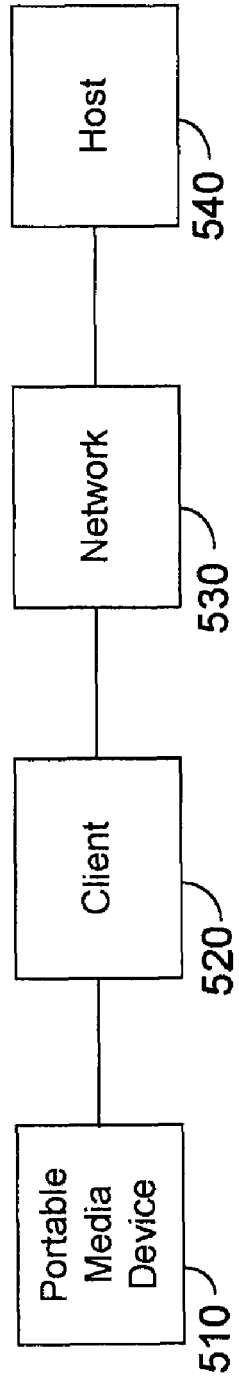
FIG. 5 is a block diagram of a communications system that includes a portable media device that may access content on a client and a host.

FIG. 5 is a block diagram of an exemplary communications system 500 that includes a portable media device that may access content on a client and a host. Generally, the portable media device 510 is configured to access content on the client 520 and on the host 540. In particular, the client 520 controls the configuration of content loaded to the portable media device 510 from a library on the client 520 and from across network 530 on host 540.

Generally, the portable media device 510 includes a miniature media rendering system operable to render electronic content to a user in mobile environments. For example, the portable media device may include a portable audio or video device that renders audio content through portable speakers or headphones and video content on a liquid crystal display. In another example, the portable media device 510 includes a wireless phone with a built-in media player. In yet another example, the portable media device 510 includes a portable game player.

The portable media device 510 includes some form of storage such as a miniature hard drive or memory bank configured to store content. The storage may be self-contained or removable.

The portable media device 510 may include one or more external interfaces from which the portable media device receives content. Typically, the external interface is used to receive electronic content and also software (e.g., firmware) that controls the operation of the portable media device.

Examples of the external interface may include, but are not limited to, Universal Serial Bus (USB) and/or FireWire connections, wireless LAN interfaces (e.g., 802.11(a), (b), (g), or (n)), Personal Area Network connections (e.g., infrared or Bluetooth™), Wide Area Network connections, wireless phone connections, and/or proprietary interfaces. The external interface may be configured to exchange data with a client 520, host 540, and/or other portable media devices (not shown).

The portable media device 510 may include a code segment that reports the user manipulations to the synchronization tool. The user manipulations may be used to select content uploaded in subsequent synchronizations. For example, when a user skips a selection, user dislike may be inferred, while advancing to or repeating a selection may be used to indicate a user preference for the genre, artist, song, or tempo.

The portable media device 510 may be configured to enable a user to purchase promotional content, for example, while listening to the promotional content. In one instance, the portable media device 510 includes a trusted code segment that unlocks the promotional content on the promotional device during listening (e.g., through the prepaid purchase of tokens). In another instance, the content is purchased upon subsequent synchronization with the library.

The client 520 typically includes a computing device enabling a user to exchange information over a communications network. The client 520 may include one or more devices capable of accessing content residing on portable media device 510 and/or host 540. The client 520 may include a controller (not shown) that processes instructions received from or generated by a software application, a program, a piece of code, a device, a computer, a computer system, or a combination thereof, which independently or collectively direct operations of the client 520. The instructions may be embodied permanently or temporarily in any type of machine, component, equipment, storage medium, or propagated signal that is capable of being delivered to the client 520 or that may reside with the controller at client 520. Client 520 may include a general-purpose computer (e.g., a personal computer (PC)) capable of responding to and executing instructions in a defined manner, a workstation, a notebook computer, a PDA ("Personal Digital Assistant"), a wireless phone, a component, other equipment, or some combination of these items that is capable of responding to and executing instructions.

In one implementation, the client 520 includes one or more information retrieval software applications (e.g., a browser, a mail application, an instant messaging client, an Internet service provider client, or an AOL TV or other integrated client) capable of receiving one or more data units. The information retrieval applications may run on a general-purpose operating system and a hardware platform that includes a general-purpose processor and specialized hardware for graphics, communications and/or other capabilities. In another implementation, client 520 may include a wireless telephone running a micro-browser application on a reduced operating system with general purpose and specialized hardware capable of operating in mobile environments.

The client 520 may include one or more media applications. For example, the client 520 may include a software application that enables the client 520 to receive and display an audio or video data stream. The media applications may include controls that enable a user to configure the user's media environment. For example, if the media application is receiving an Internet radio station, the media application may include controls that enable the user to select an Internet radio station, for example, through the use of "preset" icons indicating the station genre (e.g., country) or a favorite.

The network 530 typically includes hardware and/or software capable of enabling direct or indirect communications between the client 520 and the host 540. As such, the network 530 may include a direct link between the client 520 and the host 540, or it may include one or more networks or subnetworks between them (not shown). Each network or subnetwork may include, for example, a wired or wireless data pathway capable of carrying and receiving data. Examples of the delivery network include the Internet, the World Wide Web, a WAN ("Wide Area Network"), a LAN ("Local Area Network"), analog or digital wired and wireless telephone networks, radio, television, cable, satellite, and/or any other delivery mechanism for carrying data.

The host 540 generally includes one or more devices configured to distribute digital content. Typically, a host 540 includes a collection or library of content for distribution. Alternatively, or in addition, the host 540 may convert a media source (e.g., a video or audio feed) into a feed of data units for transmission across the network 530. The host 540 may include a general-purpose computer having a central processor unit (CPU), and memory/storage devices that store data and various programs such as an operating system and one or more application programs. Other examples of a host 540 includes a workstation, a server, a special purpose device or component, a broadcast system, other equipment, or some combination thereof capable of responding to and executing instructions in a defined manner. The host 540 also may include an input/output (I/O) device (e.g., video and audio input and conversion capability), and peripheral equipment such as a communications card or device (e.g., a modem or a network adapter) for exchanging data with the network 530.

The host 540 is generally capable of executing instructions under the command of a controller. The host 540 may be used to provide content to the client 520. The controller may be implemented by a software application loaded on the host 540 for commanding and directing communications exchanged with the client 520. Other examples of the controller include a program, a piece of code, an instruction, a device, a computer, a computer system, or a combination thereof, for independently or collectively instructing the client 520 or the host 540 to interact and operate as described. The host 540 may be embodied permanently or temporarily in any type of machine, component, physical or virtual equipment, storage medium, or propagated signal capable of providing instructions to the client 520 or the host 540.

The host 540 may be configured to store content for the portable media device 510. In one implementation, the host 510 represents a central repository that stores a user's content. The host 510 then may be configured to enable user access to the user's library regardless of whether the user is using or is in proximity to a user's client. In another implementation, the host 540 represents a robust content store. The host 540 may be configured to provide Internet radio streams, enable a user to purchase a content selection, and enable access to promotional content.

Figure 6:
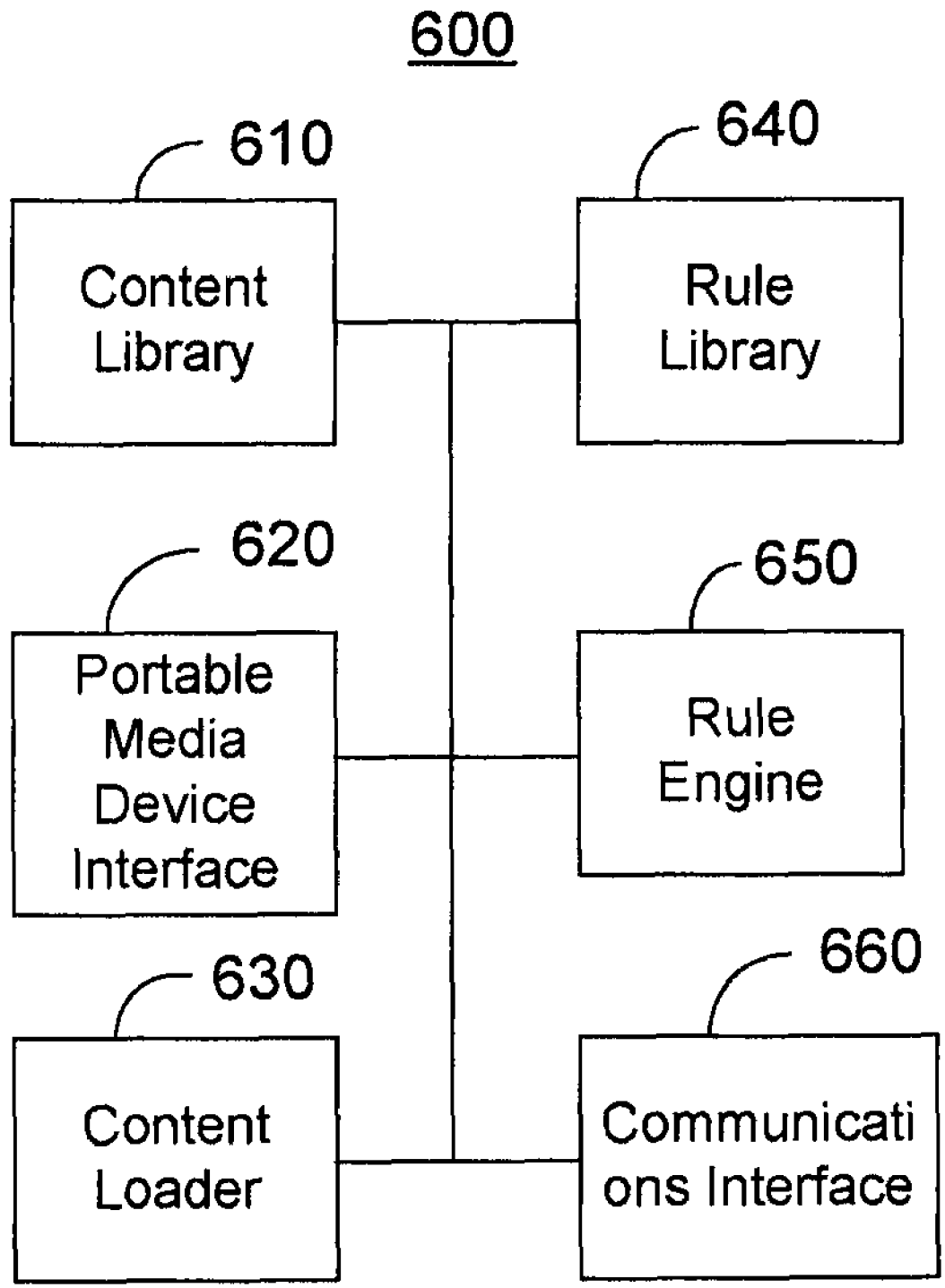
FIG. 6 is a block diagram of a content management system for a portable media device.

FIG. 6 is a block diagram of an exemplary content management system 600 for a portable media device. Typically, the content management system 600 includes one or more code segments running on a portable media device and/or a client that configures the content loaded to the portable media device. As shown, the content management system 600 includes a content library 610, a portable media device interface 620, a content loader 630, a rule library 650, a rule engine 650, and a communications interface 660.

The content library 610 includes the library of content available for loading to the portable media device through the portable media device interface 620. The content library 610 may organize content by genre, artist, actor, album, song title, popularity, ratings, encoding format (e.g., NSV or MP3), mood, relation to other content selection, effect on other content selection, or other criteria. The content library may include audio, video, images, electronic games, and/or other types of content.

The portable media device interface 620 includes an interface configured to add or remove content selections from the portable media device. Examples of the portable media device interface 620 include, but are not limited to, an Ethernet, Firewire, or USB connector, a wireless interface (e.g., Bluetooth, TDMA or 802.11(b)), or a flash memory socket.

The content loader 630 includes a code segment configured to add or remove content from the portable media device using the portable media device interface 620. The content loader may receive instructions from a rule engine 650 that determines which content should be added or removed using, for example, variation criteria or other rules specifying which content selections should be loaded on the portable media device.

The rule library 640 includes a collection of one or more rules that may be used by the rule engine 650 to determine which content selections should be loaded to the portable media device. Examples of the rules were generally described previously with respect to FIGS. 1-5. In one implementation, the rules include rules explicitly provided by the user. In another implementation, the rules represent an assimilation of preferences provided by the user.

The rule engine 650 includes a code segment configured to determine which content selections should be loaded to the portable media device interface. Generally, the rule engine 650 is configured to ensure that the rules provided by the user are reflected in the content loaded to the portable media device.

The rule engine 650 may be configured to use a weighting system to determine which content should be loaded onto a portable media device, and how the content on the portable media device should be varied according to user specification.

For example, the rule engine 650 may develop a metric for content selections in the user's content library 610. The metric may be based on a user's express or inferred preferences. For example, and as discussed previously with respect to FIG. 2, when the user selects their favorite content selections to be "preferred over everything else", the maximum metric (e.g., 10 on a scale of 10) may be assigned to those favorite content selections identified as such. Content selections identified as strongly favored may be identified with a slightly smaller metric (e.g., a 9 out of 10). Preferred content selections may receive an even smaller metric (e.g., a 7/10), while "OK" and "OK occasionally" content selections would receive even smaller metrics (e.g., a 5 and 2, respectively).

With the content selections in the content library assigned a metric, the content selections may be ranked. In one implementation, the content selections are ranked across all available content selections. In another implementation, the content selections are ranked with respect to a particular criteria (e.g., ranked according criteria designated for a partition, genre, or user-specified rule).

With the content ranked, a configuration may be generated to determine which content selections should be loaded to the portable media device. In one implementation, the content selections with the highest metrics are loaded to the content library. Such an implementation would likely include all the content selections ranked "prefer over everything else", unless limited storage created a storage conflict between content selections so designated. In the event of a storage conflict, a number of different models may be used to resolve the conflict. In one model, the storage conflict is resolved by favoring the most-listened to content selections. In a second model, the storage conflict is resolved by favoring least recently-listened content selections. Other models may be used, such as intercontent selection factors.

Implementations other than using the highest ranking metric may be used. For example, another implementation may allocate storage by different tiers. A first tier may be allocated a specified amount of storage (e.g., 50%) for content selections in a first range (e.g., above 8 on a 10 point scale). A second tier may be allocated a second amount of storage (e.g., 30%) for content selections whose metric falls in a second range (e.g., between 5 and 8), and a third tier may be allocated a third amount of storage (e.g., the remainder except for promotional material) for content selections whose metric falls within a third range (e.g., less than 5). It may be advantageous to select content selections from different tiers of metrics to provide better exposure for some content selections that might not otherwise be loaded to the portable media device.

In yet another implementation, the metrics are adjusted to reflect other priorities and influences. For example, the metric may be adjusted to better vary content. The metric may be adjusted by decrementing the content selection after a listen. The amount of decrementing may be based upon whether a user fast-forwarded or skipped through the content selection (e.g., likely to reduce a greater amount) or repeated listening to the content selection (e.g., likely to minimally reduce, if at all). The amount of decrementing also may be based on the user's reaction to similar content (e.g., content selections in the same genre, on the same album, or by the same artist). With other factors being equal, decrementing the metric in response to user activity would vary the content loaded to the portable media device as the metric for content selections originally loaded to the portable media device would eventually fall below the metric for content selections not originally loaded to the portable media device. A metric for a content selection may periodically be refreshed so that a content selection with a decremented metric is eventually eligible for reconsideration. Refreshing may be performed in response to removal of the content selection from the portable media device, after the expiration of a time window, in response to other events, and/or under other conditions.

In still another implementation, the metric is adjusted by a random factor. For example, the metric for one or more content selections may be modified by randomly adding or subtracting a random or predetermined number to the metric. When the metric is modified by a predetermined number, the predetermined number may based on the user's preference for the underlying content selections. For example, favored content may be adjusted by a lesser amount, while less popular content may be adjusted by a greater amount. It may be advantageous to adjust the metric by the random factor in order to introduce greater variations of content in the portable media device over time. If the user indicates a desire for greater or less variation, the degree of randomness can be adjusted in response.

Generally, the communications interface 660 may be used to enable access to content selections stored on other devices, such as an online music store or a server. The communications interface 660 may interface with the rule engine 650 to retrieve content responsive to the rules (e.g., promotional content). Although the communications interface 660 that interfaces with external systems and the portable media device interface 620 was described as interfacing with the portable media device, the portable media device 620 and the communications interface 660 may use the same module to access both external systems and the portable media device. For example, a wireless phone network may be used to manage content on a wireless phone and to access an online music store through the wireless interface.

Figure 7:
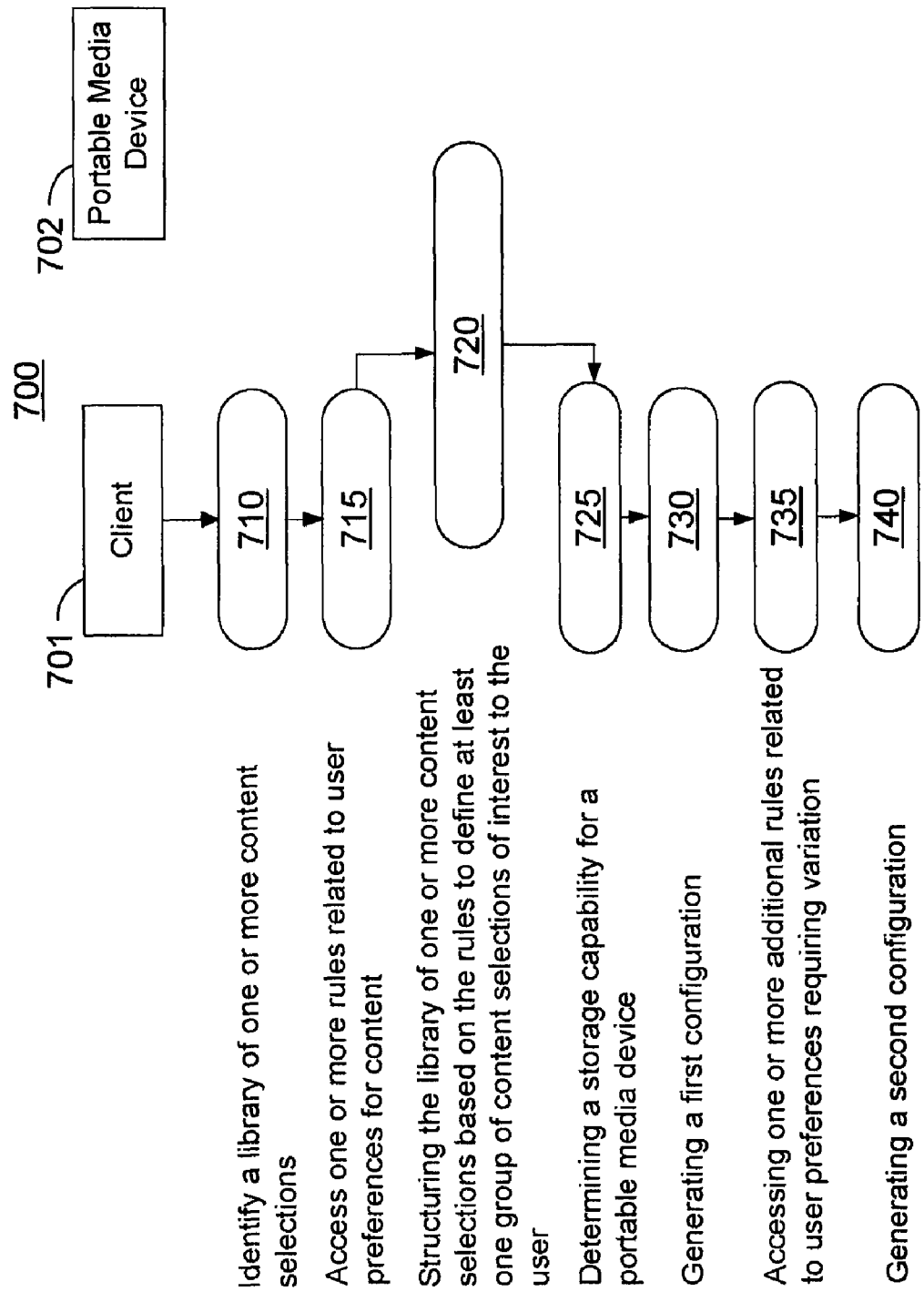
FIG. 7 is a flow chart of an exemplary process by which content selections are loaded to a portable media device.

FIG. 7 is a flow chart 700 of an exemplary process by which content selections are loaded to a portable media device. Generally, the operations shown in flow chart 700 may be used in conjunction with the systems and configurations described earlier in FIGS. 1-6. For example, the rules may be generated using the UIs shown in FIGS. 1-4. Similarly, the systems used in flow chart 700 may use the underlying systems and componentry described with respect to FIGS. 5 and 6. For convenience, particular components and messaging formats described earlier are referenced as performing the process. However, similar methodologies may be applied in other implementations where different components are used to define the structure of the system, or where the functionality is distributed differently among the components shown.

Initially, the client 701 identifies a library of one or more content selections (710). For example, the client 701 may access content selections from optical disks that have been recorded onto a PC's hard drive. The client 701 accesses one or more rules related to user preferences for content (715). For example, the client 701 may present a series of UIs shown in FIGS. 1-4. The client 701 structures the library of one or more content selections based on the rules to define at least one group of content selections of interest to the user (720). For example, the songs in a music library may be assigned metrics using, e.g., the rule engine and rule library described in FIG. 6. The songs may in turn be sorted across one or more partitions or tiers to developing a ranking of songs. The client 701 determines a storage capability for the portable media device (725). The client 701 may determine that a locally-attached portable media device has 10 GB of storage available. The client 701 generates a first configuration for the portable media device, wherein the first configuration indicates a first subset of content selections from among the group of content selections of interest to be loaded to the portable media device (730). For example, generating the first configuration may include relating the rank ordered list of songs in one or more partitions to the storage capability to determine a user's relative preferences for which content should be loaded to the portable media device. A configuration identifies which content should loaded onto the portable media device. Generally, the configuration reflects the user's explicit and implicit preferences. Explicit preference may include a user indication that a particular genre, artist, or content selection if favored. Implicit preferences may include those actions made for a user's benefit where the user did not explicitly select the genre, artist, or content selection. Examples of implicit preferences include varying the content selections loaded to the portable media device. While the user may not have endorsed or favored the content selections introduced as a result of the variation, the user did endorse a variation regime that introduced both favored and disfavored content. Another example of an implicit preference is including promotional material determined to be consistent with a user's preferences (e.g., because the user prefers the genre or artist associated with the promotional material).

Figure 8:
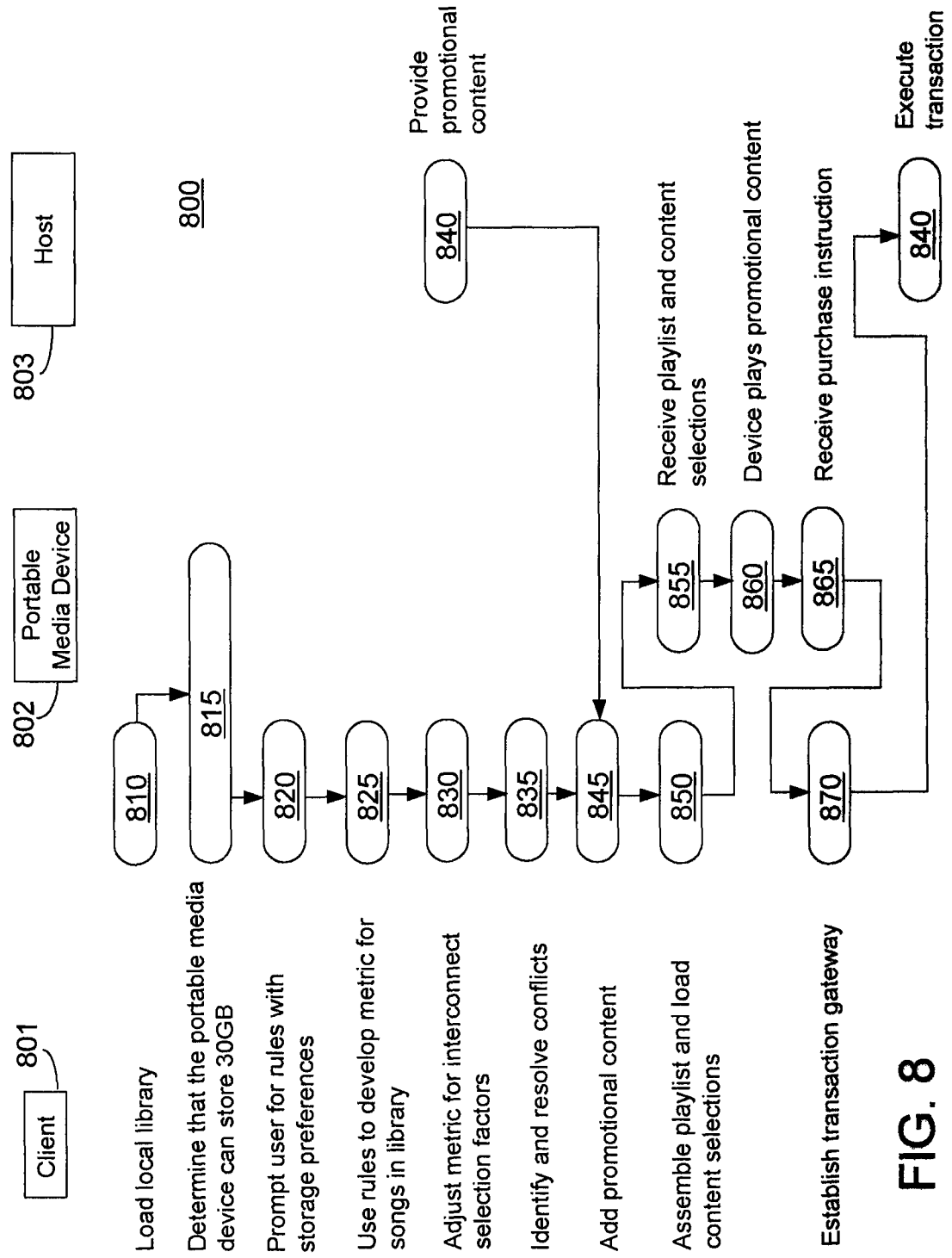
FIG. 8 is a flow chart of an exemplary process by which a client loads content to a portable media device.

The client 701 accesses one or more additional rules related to user preferences requiring variation of content to be loaded to the portable media device (735). For example, the client may access rules with different variation thresholds, such as those shown in FIG. 3C. During a subsequent connection between the portable media device and the library, the client 701 generates a second configuration for the portable media device, wherein the second configuration indicates a second subset of content selections from among the group of content selections of interest to be loaded to the portable media device, the second subset differing from the first subset in accordance with the one or more additional rules requiring variation of the content selections loaded to the portable media device (740). As a result of receiving the configuration, the portable media device 702 loads content selections consistent with the rules requiring variation. For example, content in a first partition may be varied by 50% so that 50% of the songs appearing in the second configuration remain from a first configuration and 50% of the songs in the second configuration are different from the first configuration FIG. 8 is a flow chart 800 of an exemplary process by which a client loads content to a portable media device. Generally, flow chart 800 relates to the systems, configurations, and operations described earlier with respect to FIGS. 1-7. However, flow chart 700 illustrates a process by which conflicts are resolved using intercontent selection factors and also illustrates how a portable media device may be used to purchase promotional content.

For convenience, particular components and messaging formats described earlier are referenced as performing the process. However, similar methodologies may be applied in other implementations where different components are used to define the structure of the system, or where the functionality is distributed differently among the components shown.

Initially, the client 801 loads the local library (810). Loading the library may include accessing a collection of digitized music on a personal computer. The client 801 and the portable media device 802 determine that the portable media device can store 30 GB (815). The client 801 prompts the user for rules with storage preferences (820). For example, the user may be asked to complete UIs similar to the UIs shown in FIGS. 1-4. The rules are developed for a metric for songs in the library (825). For example, a rule engine may assign a metric for content selections in the content library using the system of metrics similar to the system of metrics described with respect to the rule engine 650 in FIG. 6. The metric is adjusted for intercontent selection factors (830). In one example, the metric is used to achieve a desired variation (e.g., 30%). In another example, the metric is adjusted to reflect a user's preferences or dislikes for related content (e.g., a Bob Dylan fan would likely favor the Grateful Dead).

Conflicts are identified and resolved (835). In one example, the client 701 may determine that inadequate storage exists. As a result, the client 701 may use a metric for content selections to determine which content is loaded onto a portable media device.

The host 803 provides promotional content (840) to the portable media device 820, which in turn, receives the promotional content (845). For example, an online music provider may enable limited access to one or more content selections in order to induce the user to purchase the content selections. The online music provider may provide the content with permissions that only enable to the content a threshold number of times and/or for a threshold period of time. A configuration is loaded and a playlist is assembled (850). The portable media device receives the playlist and the configuration with the content selections. In the course of rendering content, the portable media device plays promotional content (860). The portable media device 802 receives a purchase instruction (865). For example, a user may select a menu option on the portable media device 802 indicating an intent to purchase the promotional content selection. In some implementations, the portable media device 802 lacks the communications capability to directly execute the transaction. As a result, the portable media device 802 may be configured to provide the purchase instruction while synchronizing with a client 801 (not shown). In particular, the client 801 establishes a transaction gateway (870) so that the host 803 may execute the transaction (875). For example, the client 801 may access an electronic wallet or electronic credit account and transmit an instruction that the user elects to purchase the promotional content. The host 803 may in turn authorize full access to the promotional content so that the promotional content fully joins the content library.

Other implementations are within the scope of the following claims. For example, although the portable media device was described as using a client to purchase promotional content from a host, the portable media device also may be configured to directly interface with a host. In one implementation, simplified rules are used to increase the ease of managing content and its variation on a portable media device, which may increase overall enjoyment by using sophisticated backend variation algorithms while reducing the time and effort required of a user. In contrast, in another implementation, a user may precisely tailor the rules using a complex rule set so that available content on the portable media device is more particularly tailored to a user's interest.

The rules requiring variation may vary the content selections between first and second configurations based on criteria other than dynamic updates to the library. For example, a library on a personal computer may be dynamically updated as the user adds additional content. The additional content may be analyzed using user preferences so that the additional content would be added to the portable media device. Notwithstanding changes to library as a result of the additional content, the rules requiring variation based on criteria other than the addition of content to the library. For example, the variation threshold may require that 50% of songs present in a first configuration be removed from a second configuration, or, alternatively, that 70% of the songs present in a first configuration also appear in a second configuration.

What is claimed is:

1. A method of managing content on a portable media device, the method comprising:
 accessing one or more rules related to user preferences for content;
 accessing one or more content selections;
 identifying, from among the one or more content selections, a first group of content selections of interest to a user based on the one or more rules related to user preferences for content;
 generating a first configuration for the portable media device, wherein the first configuration indicates that the first group of content selection is to be loaded on the portable media device;
 accessing one or more additional rules related to user preferences for content, the one or more additional rules requiring variation of content selections to be loaded on the portable media device independent of user selection of the content selections;
 identifying, from among the one or more content selections, a second group of content selections of interest to the user based on the one or more additional rules related to user preferences for content, the second group of content selections differing from the first group of content selections according to the variation required in the one or more additional rules; and
 generating a second configuration for the portable media device, wherein the second configuration indicates that the second group of content selections is to be loaded on the portable media device.

2. The method of claim 1, wherein:
 generating the first configuration for the portable media device comprises automatically generating the first configuration for the portable media device during a first connection between the portable media device and a system storing the one or more content selections, and
 generating the second configuration for the portable media device comprises automatically generating the second configuration for the portable media device during a second connection between the portable media device and the system storing the one or more content selections, the second connection being subsequent to the first connection.

3. The method of claim 1 further comprising determining an entire storage capacity of the portable media device, wherein:
 identifying the first group of content selections of interest to the user comprises identifying the first group of content selections of interest to the user such that the storage capacity required to store the first group of content selection of interest to the user is less than the entire storage capacity of the portable media device, and
 identifying the second group of content selections of interest to the user comprises identifying the second group of content selections of interest to the user such that the storage capacity required to store the second group of content selection of interest to the user is less than the entire storage capacity of the portable media device.

4. The method of claim 1 further comprising determining available storage capacity of the portable media device, the available storage capacity of the portable media device being less than an entire storage capacity of the portable media device, wherein:
 identifying the first group of content selections of interest to the user comprises identifying the first group of content selections of interest to the user such that the storage capacity required to store the first group of content selection of interest to the user is less than the available storage capacity of the portable media device, and
 identifying the second group of content selections of interest to the user comprises identifying the second group of content selections of interest to the user such that the storage capacity required to store the second group of content selection of interest to the user is less than the available storage capacity of the portable media device.

5. The method of claim 1, wherein accessing the one or more additional rules related to user preferences for content comprises accessing a variation threshold.

6. The method of claim 5, wherein the variation threshold is expressed as a desired rate of change between two groups of content selections to be loaded on the portable media device.

7. The method of claim 5, wherein the variation threshold is expressed as a desired percentage of change between two groups of content selections to be loaded on the portable media device.

8. The method of claim 1, wherein:
 the portable media device includes multiple partitions, and
 accessing the one or more additional rules related to user preferences for content comprises accessing a variation threshold associated with only one of the multiple partitions of the portable media device.

9. The method of claim 1, wherein:
 the portable media device includes multiple partitions, and accessing the one or more additional rules related to user preferences for content comprises accessing multiple variation thresholds, each of the multiple variation thresholds being associated with one of the multiple partitions of the portable media device, and each of the multiple variation thresholds being different from one another.

10. The method of claim 1, wherein accessing the one or more rules related to user preferences for content comprises accessing one or more default rules.

11. The method of claim 1, wherein accessing the one or more rules related to user preferences for content comprises receiving, from the user, the one or more rules related to user preferences for content.

12. The method of claim 1, wherein accessing the one or more additional rules related to user preferences for content comprises receiving, from the user, the one or more additional rules related to user preferences for content.

13. The method of claim 1, wherein accessing the one or more rules related to user preferences for content comprises accessing a promotional instruction configured to load promotional content on the portable media device.

14. The method of claim 1, wherein accessing the one or more additional rules related to user preferences for content comprises accessing a rule configured to access the first group of content selections.

15. The method of claim 1, wherein:
generating the first configuration for the portable media device comprises automatically generating the first configuration for the portable media device without human intervention, and
generating the second configuration for the portable media device comprises automatically generating the second configuration for the portable media device without human intervention.

16. The method of claim 1, accessing the one or more rules related to user preferences for content comprises accessing one or more rules specifying a preference for one or more of a genre, an artist, an album, a studio, a record label, a tempo, a mood, a station, a channel, or a content provider.

17. The method of claim 1, wherein accessing the one or more additional rules related to user preferences comprises accessing one or more additional rules specifying that the content selections loaded on the portable media device should be varied every synchronization, every day, every week, after every content selection on the portable media device has been perceived, after a particular content selection on the portable media device has been perceived, or when a replacement content selection becomes available.

18. The method of claim 1 further comprising:
monitoring a user's interaction with one or more content selections included in the first group of content selections loaded on the portable media device, wherein identifying the second group of content selections of interest to the user comprises identifying the second group of content selections of interest to the user based on the user's interaction with the one or more content selections included in the first group of content selections.

19. A system comprising a processor connected to a storage device for managing content on a portable media device, the processor being configured to:
access one or more rules related to user preferences for content;
access one or more content selections;
identify, from among the one or more content selections, a first group of content selections of interest to a user based on the one or more rules related to user preferences for content;
generate a first configuration for the portable media device, wherein the first configuration indicates that the first group of content selection is to be loaded on the portable media device;
access one or more additional rules related to user preferences for content, the one or more additional rules requiring variation of content selections to be loaded on the portable media device independent of user selection of the content selections;
identify, from among the one or more content selections, a second group of content selections of interest to the user based on the one or more additional rules related to user preferences for content, the second group of content selections differing from the first group of content selections according to the variation required in the one or more additional rules; and
generate a second configuration for the portable media device, wherein the second configuration indicates that the second group of content selections is to be loaded on the portable media device.

20. A machine-readable storage device storing a computer program for managing content on a portable media device, the computer program including instructions that, when executed, cause at least one processor to:
access one or more rules related to user preferences for content;
access one or more content selections;
identify, from among the one or more content selections, a first group of content selections of interest to a user based on the one or more rules related to user preferences for content;
generate a first configuration for the portable media device, wherein the first configuration indicates that the first group of content selection is to be loaded on the portable media device;
access one or more additional rules related to user preferences for content, the one or more additional rules requiring variation of content selections to be loaded on the portable media device independent of user selection of the content selections;
identify, from among the one or more content selections, a second group of content selections of interest to the user based on the one or more additional rules related to user preferences for content, the second group of content selections differing from the first group of content selections according to the variation required in the one or more additional rules; and
generate a second configuration for the portable media device, wherein the second configuration indicates that the second group of content selections is to be loaded on the portable media device.

* * * * *